(12) United States Patent
Yushin et al.

(10) Patent No.: US 10,892,486 B2
(45) Date of Patent: Jan. 12, 2021

(54) SOLID ELECTROLYTE TECHNOLOGY WITH REARRANGEABLE BONDS FOR METAL AND METAL-ION BATTERIES

(71) Applicant: Sila Nanotechnologies, Inc., Alameda, CA (US)

(72) Inventors: Gleb Yushin, Atlanta, GA (US); Kostiantyn Turcheniuk, Atlanta, GA (US); Yiran Xiao, Atlanta, GA (US); Ah-Young Song, Atlanta, GA (US); Oleg Borodin, Adelphi, MD (US); Naoki Nitta, Alameda, CA (US)

(73) Assignees: SILA NANOTECHNOLOGIES INC., Alameda, CA (US); GEORGIA TECH RESEARCH CORPORATION, Atlanta, GA (US); THE UNITED STATES OF AMERICA AS REPRESENTED BY THE SECRETARY OF THE ARMY, Washington, DC (US)

( * ) Notice: Subject to any disclaimer, the term of this patent is extended or adjusted under 35 U.S.C. 154(b) by 191 days.

(21) Appl. No.: 16/022,572

(22) Filed: Jun. 28, 2018

(65) Prior Publication Data

US 2019/0006672 A1 Jan. 3, 2019

Related U.S. Application Data

(60) Provisional application No. 62/526,307, filed on Jun. 28, 2017.

(51) Int. Cl.
*H01M 4/58* (2010.01)
*H01M 10/052* (2010.01)
(Continued)

(52) U.S. Cl.
CPC ............ *H01M 4/581* (2013.01); *C01D 15/00* (2013.01); *C01F 17/00* (2013.01);
(Continued)

(58) Field of Classification Search
CPC ............... H01M 4/581; H01M 10/052; H01M 10/0562; H01M 4/364; H01M 4/463;
(Continued)

(56) References Cited

U.S. PATENT DOCUMENTS

2007/0224509 A1* 9/2007 Aramata ............... H01M 4/136
429/231.95

* cited by examiner

*Primary Examiner* — Gary D Harris
(74) *Attorney, Agent, or Firm* — Muncy, Geissler, Olds & Lowe, P.C.; Daniel Podhajny (57) ABSTRACT

In an embodiment, a metal or metal-ion battery cell, includes anode and cathode electrodes, a separator electrically separating the anode and the cathode, and a solid electrolyte ionically coupling the anode and the cathode, wherein the solid electrolyte comprises a material having one or more rearrangeable chalcogen-metal-hydrogen groups that are configured to transport at least one metal-ion or metal-ion mixture through the solid electrolyte, wherein the solid electrolyte exhibits a melting point below about 350° C. In an example, the solid electrolyte may be produced by mixing different dry metal-ion compositions together, arranging the mixture inside of a mold, and heating the mixture while arranged inside of the mold at least to a melting point (e.g., below about 350° C.) of the mixture so as to produce a material comprising one or more rearrangeable chalcogen-metal-hydrogen groups.

26 Claims, 9 Drawing Sheets

(51) Int. Cl.
   *H01M 10/0562* (2010.01)
   *H01M 4/36* (2006.01)
   *H01M 4/46* (2006.01)
   *C01F 17/00* (2020.01)
   *H01M 4/88* (2006.01)
   *H01M 4/04* (2006.01)
   *H01M 4/40* (2006.01)
   *C01D 15/00* (2006.01)

(52) U.S. Cl.
   CPC ......... *H01M 4/0433* (2013.01); *H01M 4/364* (2013.01); *H01M 4/405* (2013.01); *H01M 4/463* (2013.01); *H01M 4/8882* (2013.01); *H01M 10/052* (2013.01); *H01M 10/0562* (2013.01); *C01P 2002/52* (2013.01); *C01P 2002/72* (2013.01); *C01P 2002/85* (2013.01); *C01P 2002/89* (2013.01); *C01P 2004/03* (2013.01); *C01P 2004/62* (2013.01); *C01P 2004/64* (2013.01); *H01M 2300/008* (2013.01); *H01M 2300/0068* (2013.01)

(58) Field of Classification Search
   CPC .. H01M 4/8882; H01M 4/0433; H01M 4/405; H01M 2300/0068; H01M 2300/008; C01D 15/00; C01F 17/00; C01P 2002/89; C01P 2004/03; C01P 2002/52; C01P 2002/72; C01P 2004/64; C01P 2002/85; C01P 2004/62
   USPC ........................................................ 429/479
   See application file for complete search history.

SOLID ELECTROLYTE TECHNOLOGY WITH REARRANGEABLE BONDS FOR METAL AND METAL-ION BATTERIES

CLAIM OF PRIORITY UNDER 35 U.S.C. § 119

The present application for patent claims the benefit of U.S. Provisional Application No. 62/526,307, entitled "Enhanced Solid Electrolyte Technology with Rotating Bond for Metal and Metal-Ion Batteries," filed Jun. 28, 2017, which is expressly incorporated herein by reference in its entirety.

GOVERNMENT LICENSE RIGHTS

This invention was made with government support under Award ID DE-AR0000779 awarded by the Advanced Research Projects Agency-Energy (ARPA-E) within the United States Department of Energy (DOE). The government has certain rights in the invention.

BACKGROUND

Field

The present disclosure relates generally to energy storage devices, and more particularly to solid electrolytes for metal and metal-ion battery technology and the like.

Background

Owing in part to their relatively high energy densities, relatively high specific energy, light weight, and potential for long lifetimes, advanced rechargeable metal and metal-ion batteries, such as lithium (Li) and lithium-ion (Li-ion) batteries, are desirable for a wide range of consumer electronic, electric vehicle, grid storage, and other applications. Similarly, primary metal and metal-ion batteries, such as primary Li batteries, are desired for a range of applications, where high energy density and/or high specific energy batteries are needed, even if the batteries may be disposed of after a single use.

One desirable feature of metal and metal-ion batteries for many applications is enhanced safety. It is desirable that batteries do not induce fire, even under extreme cases such as a nail penetration test. Solid electrolytes, which may be alternatively referred to as solid state electrolytes (SSEs), may, in principle, provide such enhanced safety. Recently, Li oxyhalides ($Li_3OX$), for example, have emerged as new classes of low-cost, lightweight SSE compounds showing promising Li-ion conductivities. However, their typical syntheses often bring contaminations and uncontrollable escape of volatiles. In addition, the similarity in the lattice parameters between Li halide hydroxides ($Li_2OHX$) and $Li_3OX$ combined with insufficient rigor in material characterization often leads to erroneous interpretations of the reported material compositions. Moisture remaining in the synthesized products or cell assembling environment, leaks in the electrochemical cells, and variability in the equivalent circuit models may additionally contribute to significant errors in the reported properties.

Accordingly, there remains a need for improved solid electrolytes for metal and metal-ion batteries, components, and other related materials and manufacturing processes.

SUMMARY

Embodiments disclosed herein address the above stated needs by providing improved batteries, components, and other related materials and manufacturing processes.

An embodiment is directed to a metal or metal-ion battery cell, including anode and cathode electrodes, a separator electrically separating the anode and the cathode, and a solid electrolyte ionically coupling the anode and the cathode, wherein the solid electrolyte comprises a material having one or more rearrangeable chalcogen-metal-hydrogen groups that are configured to transport at least one metal-ion or metal-ion mixture through the solid electrolyte.

Another embodiment is directed to a method of synthesizing a solid electrolyte, including providing a first dry metal-ion composition comprising a chalcogen, a metal or metal mixture, and hydrogen, providing a second dry metal-ion composition comprising the metal halide or a mixture of metal halides, mixing the first and second dry metal-ion compositions together, arranging the mixture inside of a mold, and heating the mixture while arranged inside of the mold at least to a melting point of the mixture so as to produce a material comprising one or more rearrangeable chalcogen-metal-hydrogen groups that are configured to transport at least one metal-ion or metal-ion mixture through the material, wherein the melting point of the mixture below about 350° C.

BRIEF DESCRIPTION OF THE DRAWINGS

The accompanying drawings are presented to aid in the description of embodiments of the invention and are provided solely for illustration of the embodiments and not limitation thereof.

FIGS. 2A-2E illustrate example characterizations of $Li_2OHCl$. More specifically.

FIGS. 3A-3C illustrate example in-situ structural characterizations of $Li_2OHCl$. More specifically.

FIGS. 4A-4F illustrate example characterizations of H content in the deprotonated $Li_{2+x}OH_{1-x}Cl$. More specifically, FIG. 4C illustrates XRD of $Li_{2.4}OH_{0.6}Cl$.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion, and other metal and metal-ion batteries, etc.).

While the description below may describe certain examples in the context of lithium halide hydroxides for Li-ion or Li metal batteries, it will be appreciated that various aspects may be applicable to other chemistries, including (but not limited) to lithium-lanthanum halide hydroxides (including the ones that comprise two or three or four different halogen species—Cl, Br, F, I; also including the ones that comprise lanthanides other than lanthanum or in addition to lanthanum), lithium-yttrium halide hydroxides (including the ones that comprise two or three or four different halogen species), lithium-scandium halide hydroxides (including the ones that comprise two or three or four different halogen species), lithium-magnesium halide hydroxides (including the ones that comprise two or three or four different halogen species), lithium-calcium halide hydroxides (including the ones that comprise two or three or four different halogen species), lithium-strontium halide hydroxides (including the ones that comprise two or three or four different halogen species), lithium-barium halide hydroxides (including the ones that comprise two or three or four different halogen species), lithium-caesium halide hydroxides (including the ones that comprise two or three or four different halogen species), lithium-boron halide hydroxides (including the ones that comprise two or three or four different halogen species), their various mixtures and solid solutions, among others.

While the description below may describe certain examples in the context of lithium halide hydroxides and other compositions with relatively high content of hydrogen (e.g., up to 2:1 in Li:H atomic ratios), it will be appreciated that various aspects may be applicable to compositions with significantly smaller hydrogen content (e.g., down to around 200:1 in Li:H atomic ratios or even lower).

While the description below may describe certain examples in the context of lithium halide hydroxides and other compositions with relatively high content of oxygen (e.g., up to 1:1 in halogen(s):oxygen atomic ratios), it will be appreciated that various aspects may be applicable to compositions with significantly smaller oxygen content (e.g., down to around 200:1 in halogen(s):oxygen atomic ratios or even lower).

While the description below may describe certain examples in the context of lithium halide hydroxides and other compositions with a single halogen type (e.g., either only Cl or only Br), it will be appreciated that various aspects may be applicable to compositions with two or three or four different halogen atoms (e.g., various mixtures of Cl, Br, I and F).

While the description below may describe certain examples in the context of solid electrolyte compositions, it will be appreciated that various aspects may be applicable to semi-solid compositions, where a small amount of solvents or ionic liquids (e.g., 1-50 vol. % of the total electrolyte composition) is added to milled (e.g., in some designs down to a few nm in size) solid electrolyte composition so that the overall electrolyte composition comprises a mixture of solid and liquid phases.

While the description below may describe certain examples in the context of single phase (e.g. a solid solution) electrolyte compositions, it will be appreciated that various aspects may be applicable to compositions comprising two or three or even four distinct phases. In an example, each phase may exhibit a different melting point and/or ionic conductivity.

While description below may describe certain examples in the context lithium halide hydroxides and other compositions, it will be appreciated that various aspects may be applicable to electrolyte composition comprising such compositions as a part of a "mixed" final electrolyte.

Figure 1A:
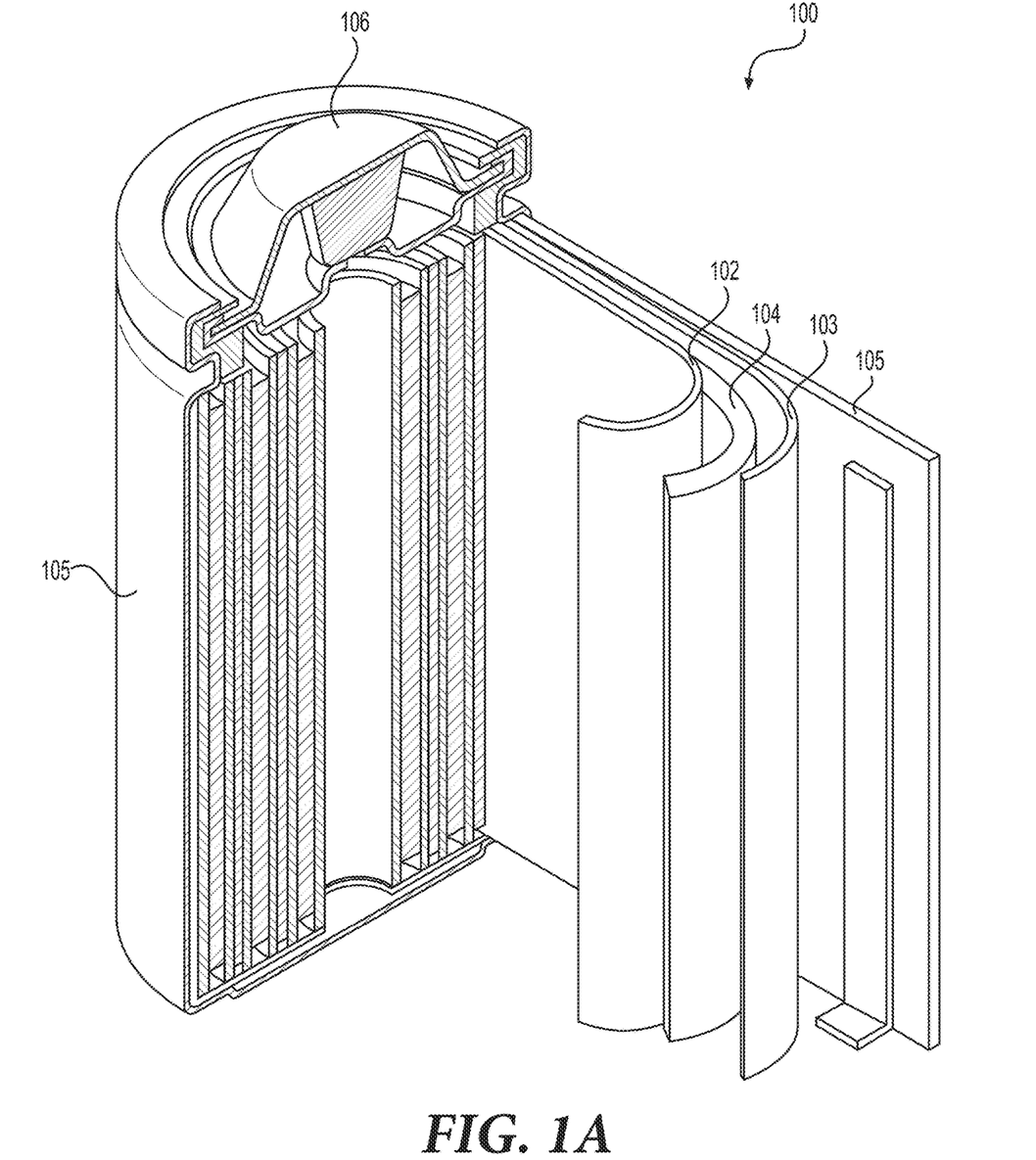
FIG. 1A illustrates an example metal or metal-ion (e.g., Li-ion) battery in which the components, materials, methods, and other techniques described herein, or combinations thereof, may be applied according to various embodiments.

FIG. 1A illustrates an example metal or metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown explicitly) impregnating the separator 104, a battery case 105, and a sealing member 106 sealing the battery case 105.

Solid electrolytes may provide some advantages for metal and metal-ion cells, such as stability against oxidation at high cathode potentials, reduced undesirable side reactions between the cathode and electrolyte, reduced undesirable side reactions between the anode and electrolyte, and enhanced safety. As briefly discussed in the background above, one class of low-cost, lightweight solid state electrolytes (SSEs) exhibiting an antiperovskite crystal structure, referred to as Li-antiperovskites in the case of Li-ion conductive SSEs, for example, and having structures similar to perovskites $ABO_3$ (cubic, Pm-3m), but with inverted charge $Li_3AB$, has been recently reported to exhibit a combination of low processing temperatures and high ionic conductivities at near-room temperatures. In some examples, A is oxygen (O) and B is a halogen (X), such as Cl or Br. Different theoretical and experimental studies of Li-antiperovskites, however, have reported a range of determined conductivities, creating a controversy surrounding this class of SSEs.

Lithium halide hydroxides ($Li_2OHX$) also adopt the $Li_3AB$ structure. Unlike $Li_3OCl$ salt, where six Li atoms occupy the vertices of a $Li_6O$ octahedral, in $Li_2OHX$ the vertices are occupied by four lithium atoms, leaving two other sites vacant. Morphological parameters may affect the conductivities of such SSEs. For example, a cubic crystal lattice favors faster $Li^+$ diffusion and thus may be preferential over lower symmetry phases for certain SSEs.

Because lithium halide hydroxides are relatively reactive, lithium halide hydroxides may become undesirably and uncontrollably doped during synthesis by catching metal ions from the reaction vessels in which they are synthesized. Examples of vessel materials are aluminum (Al), nickel (Ni), and silver (Ag), to name a few. The resultant conductivities of uncontrollably doped $Li_2OHX$ can thus be significantly altered, since only 0.005 at. % of dopants may be sufficient to drastically change the conductivity values. In principle, such undesired doping of $Li_2OHX$ can be reduced or fully avoided by decreasing reaction times, using inert reaction vessels and/or carefully controlling the elemental composition. Unfortunately, such controls may be ignored. In addition, the similarity in the lattice parameters between Li halide hydroxides ($Li_2OHX$) and Li oxyhalides ($Li_3OX$) may lead to misidentification, unless X-ray diffraction (XRD) is conducted very accurately. Difficulties detecting Li and H by some material characterization techniques may also add uncertainties. In fact, insufficient rigor in conventionally reported material characterizations may have resulted in erroneous conclusions that certain produced materials included $Li_3OCl$ or $Li_3OBr$ or their mixtures, while these produced materials may actually include lithium halide hydroxides (e.g., $Li_2OHCl$ or $Li_2OHBr$ or their mixtures) or at the very least incompletely de-protonated $Li_{2+y}OH_{1-y}X$. Further, uncontrolled moisture remaining in the material after synthesis or leaks in the electrochemical cells may significantly alter the measured conductivities, and may potentially be responsible for some of the conventionally reported high conductivity values. Since the presence of thermodynamically unstable $H_2O$ induces undesirable side reactions and gas evolution in certain full cells during cycling, and since various solvated ions may contribute to the total ion conduction of moist SSE, it is generally desirable to reduce or avoid moisture for careful comparative analysis.

Some embodiments of the disclosure are thereby directed to a low-contaminant (e.g., contaminant-free) high-temperature reaction for synthesis of Li halide hydroxides, by way of example, via a relatively fast (e.g., 2 min) and scalable technique. Similar techniques may be used for the synthesis of a broad range of halide hydroxides of other metal ions (e.g., Na, K, Mg, Ca, etc.) or mixed metal ions. To unambiguously identify the produced compositions associated with certain embodiments of the disclosure, the inventors conducted a comprehensive study using advanced techniques, such as $^1H$ Nuclear Magnetic Resonance (NMR), Energy Dispersive Spectroscopy (EDS), Time-of-Flight Secondary Ion Mass Spectrometry (TOF-SIMS), and X-Ray Photoelectron Spectroscopy (XPS) in addition to in-situ variable temperature XRD. The experimentally detected phase transformations in $Li_2OHX$ provide insights into the influence of the structural parameters on $Li^+$ conductivity. The present disclosure also describes utilization of a deprotonation/lithiation technique in mild reaction conditions to synthesize selected $Li_{2+x}OH_{1-x}Cl$ ($0 \leq x < 1$) SSEs, as well as experimentally demonstrating that the presence of H enhances ionic conductivity of such SSEs. Born-Oppenheimer molecular dynamics (BOMD) simulations of $Li_{2+x}OH_{1-x}Cl$ ($0 \leq x \leq 1$) SSEs may also provide key insights into the mechanism of $Li^+$ transport and the influence of H concentration on it, complementing previous modeling studies of H-free antiperovskites. To reduce or prevent uncontrolled moisture from changing measured ionic conductivity, certain embodiments of the disclosure reduce or avoid the use of aqueous synthesis routes, reduce synthesis time and utilize vacuum-tight coin cells, the mass of which may be carefully measured before and after testing to detect possible leaks. One or more of the techniques and embodiments described herein may be used to reduce the existing confusion and, more practically, harness pathways for tuning SSE compositions for further improved $Li^+$ conductivities.

Figure 1B:
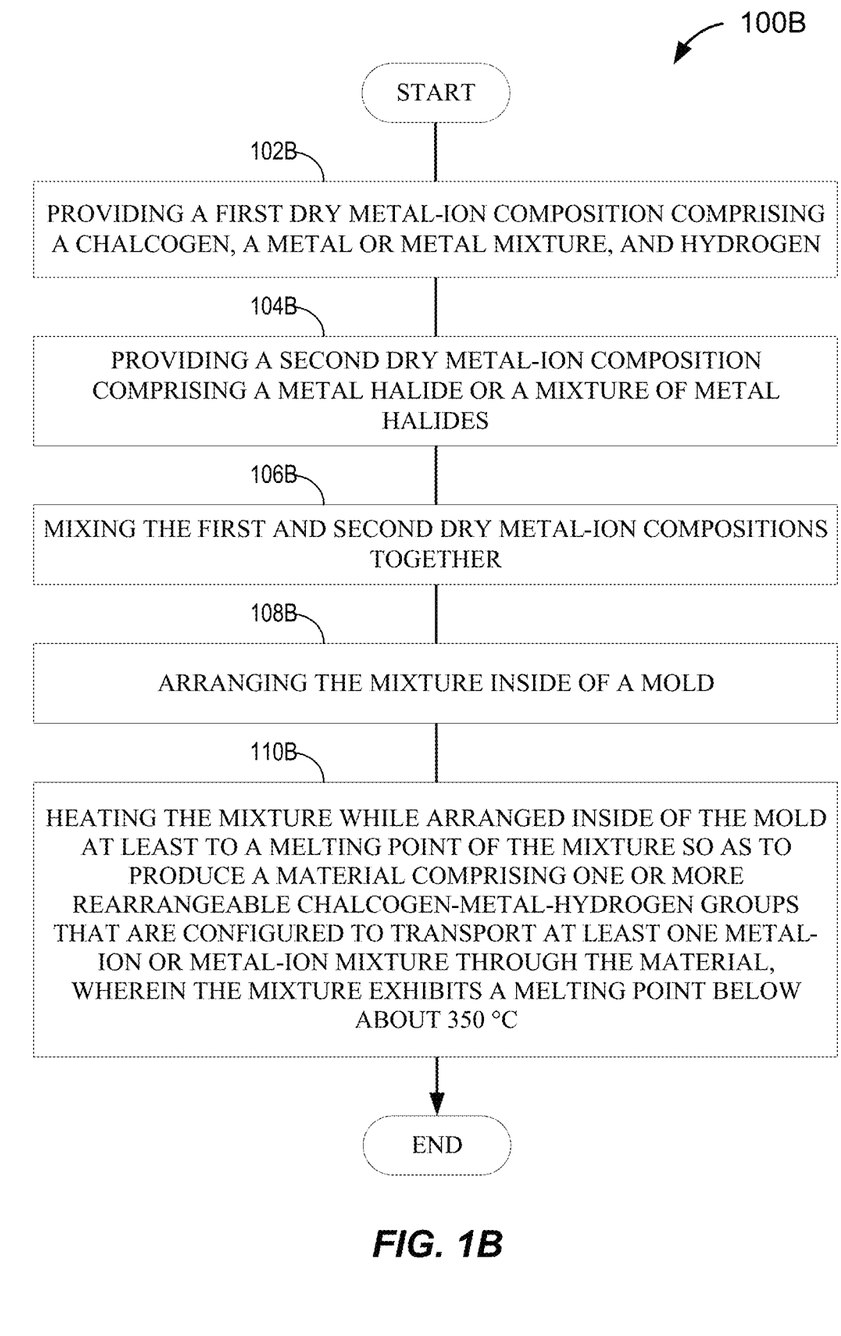
FIG. 1B illustrates a process of synthesizing a solid state electrolyte (SSE) in accordance with an aspect of the disclosure.

FIG. 1B illustrates a process 100B of synthesizing an SSE in accordance with an aspect of the disclosure. At 102B, a first dry metal-ion composition comprising a chalcogen, a metal or metal mixture, and hydrogen is provided. In an example, the chalcogen in the first dry metal-ion composition may comprise O, S, a mixture of O and S, a mixture of chalcogen(s) with N, a mixture of chalcogen(s) with P, or any combination thereof. In a further example, the first dry metal-ion composition comprises LiOH, LiSH, LiNH, $Bi(OH)_3$, or a combination thereof.

At 104B, a second dry metal-ion composition comprising a metal halide or a mixture of metal halides is provided. In an example, the halide or halide mixture comprises Cl, F, Br, I or a mixture thereof.

Referring to 102B-104B of FIG. 1B, in an example, the first metal-ion composition and/or the second metal-ion composition comprise Li, Na, K, Mg, Ca, Sr, or Ba. In a further example, the first metal-ion composition and/or the second metal-ion comprise a mixture of the metal ion with one or more other ions.

At 106B, the first and second dry metal-ion compositions are mixed together. In an example, the metal-ion mixture comprises a mixture of the metal ion with a transition metal or transition metal mixture. In a further example, the transition metal or transition metal mixture comprises $Al^{3+}$, $Ta^{3+}$, $Zr^{4+}$, $Hf^{4+}$, or a combination thereof. In another example, the metal-ion mixture comprises a mixture of the metal ion with a rare-earth metal, such as Sc, Y or La.

At 108B, the mixture is arranged inside of a mold. In an example, the mold comprises a material that is inert to the metal-ion halide hydroxide composition, such as graphite.

At 110B, while the mixture remains arranged inside of the mold, the mixture is heated (e.g., via induction heating) at least to a melting point (e.g., below about 350° C.,=etc.) of the mixture so as to produce a material comprising one or more rearrangeable chalcogen-metal-hydrogen groups that are configured to transport at least one metal-ion or metal-ion mixture through the material.

In an example implementation of the process of FIG. 1B, $Li_2OHCl$ salts were synthesized using an induction heating technique from dry LiOH mixed with dry LiCl. A graphite mold was used because graphite is mostly inert and does not react with the reactive groups of $Li_2OHX$. Therefore, this method brings little to no uncontrollable impurities, such as heavy metals and aluminates. A homogenous liquid melt was casted at 450° C. to obtain a solidified product. The understanding of the elemental composition is important and is often neglected in certain conventional works, therefore making the evaluation of the influence of chemical composition on the ionic conductivities difficult. In conjunction with the implementation of this particular embodiment of the present disclosure, the elemental composition was first calculated by means of EDS and $^1H$ NMR techniques.

Figure 2A:
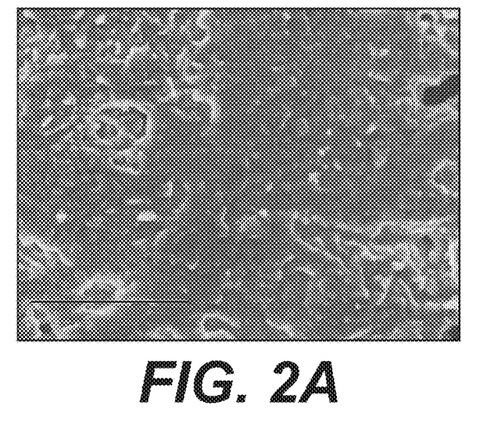
FIG. 2A and FIG. 2B illustrate scanning electron microscope (SEM) micrograph and Energy Dispersive X-Ray Spectroscopy (EDS) analysis mapping, respectively, where the scale bar is 25 μm.
Figure 2B:
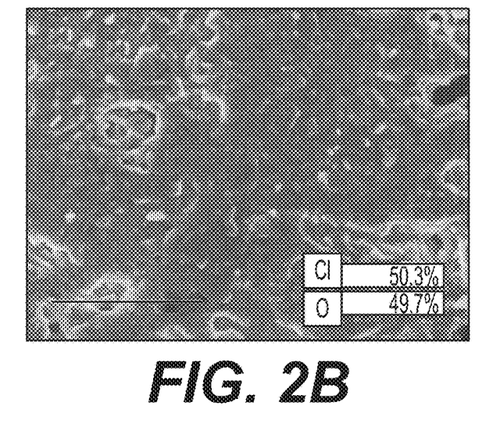
Figure 2C:
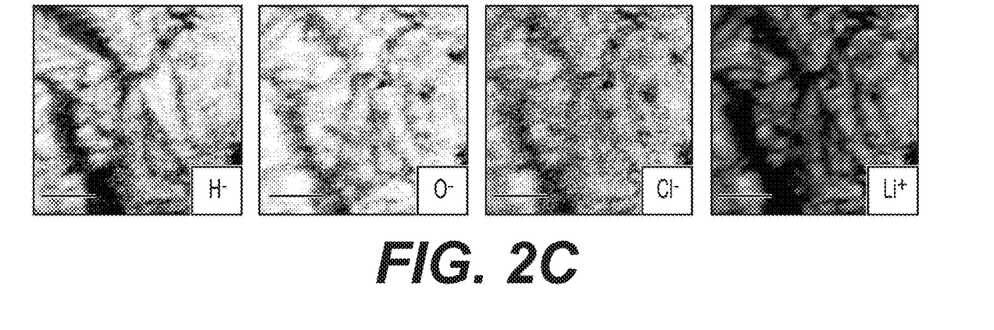
FIG. 2C illustrates secondary ion mass spectrometry (SIMS) imaging that reveals the lateral distribution of $^1H^-$, $^{16}O^-$, $^{37}Cl^-$, and $^7Li^+$ ions, where the scale bar is 50 μm.
Figure 2D:
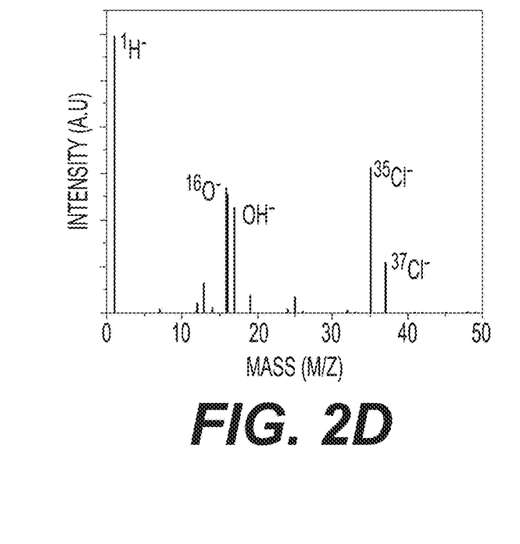
FIG. 2D and FIG. 2E illustrate time-of-flight (TOF)-mass spectrometry of negative and positive ions of the scanned region.
Figure 2E:
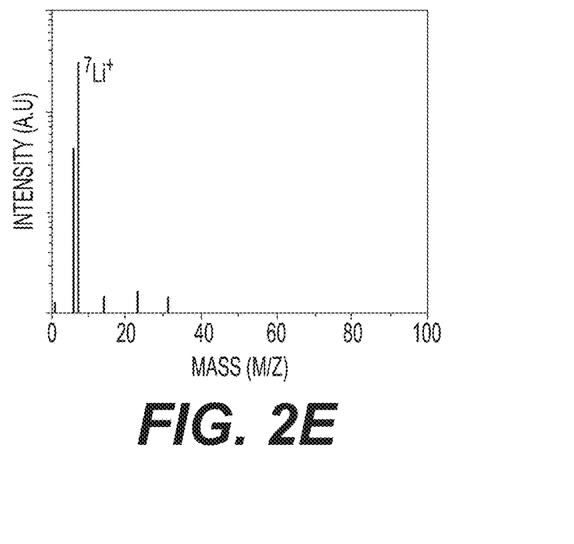

FIGS. 2A-2E show example results of such characterization techniques conducted on $Li_2OHCl$ in accordance with an embodiment of the disclosure. More specifically, FIG. 2A and FIG. 2B illustrate scanning electron microscope (SEM) micrograph and Energy Dispersive X-Ray Spectroscopy (EDS) analysis mapping, respectively, where the scale bar is 25 μm; FIG. 2C illustrates secondary ion mass spectrometry (SIMS) imaging that reveals the lateral distribution of $^1H^-$, $^{16}O^-$, $^{37}Cl^-$, and $^7Li^+$ ions, where the scale bar is 50 μm; FIG. 2D and FIG. 2E illustrate time-of-flight (TOF)-mass spectrometry of negative and positive ions of the scanned region.

Referring to FIGS. 2A-2E, the content of Cl to O was calculated throughout the surface of the cold-pressed pellet of $Li_2OHCl$ and averaged 50±0.3 at. %. The mass loss during the high-temperature reaction between LiOH and LiCl was less than about 1 wt. %, suggesting that the conventionally proposed formation of $H_2O$ vapors does not take place. Temperature cycling (i.e., heating of $Li_2OHCl$ to 650° C. and back to room temperature) for five times did not increase mass losses, as might be expected for dry LiOH or LiCl samples in case of the lack of $H_2O$ evolution reactions. The lack of noticeable mass losses additionally helps to ensure formation of stochiometric compounds.

The chemical composition of the SSEs was determined by combining quantitative NMR. The protons (H) of the hydroxyl groups are very labile and exchange with deuterium (D). Therefore, the quantification of $H_2O$ content liberated upon dissolution of $Li_2OHCl$ in $D_2O$ can be used to determine H content in the specimen in accordance with the following:

$$Li_2OHCl+0.5D_2O \rightarrow Li_2ODCl+0.5H_2O \qquad (Eq.\ 1)$$

Sodium 3-(3-methylsilyl)propionate was used to compare its absolute integral in 1H NMR to the integral of $H_2O$ released. In addition to NMR, TOF-SIMS imaging was used to reveal the lateral distribution of four elements of interest on the surface of the SSEs, such as H, O, Cl and Li in the case of $Li_2OHCl$ (FIG. 2C). The overlay of $^1H^-$, $^{16}O^-$, $^{37}Cl^-$, and $^7Li^+$ clearly indicates uniform lateral distribution. The negative mode m/z spectrum contains $^1H^-$, $^{16}O^-$, $^{35}Cl^-$ and $^{37}Cl^-$ high intensity ions (FIG. 2D). The existence of high intensity $OH^-$ proves the presence of hydroxyl ions in the Li salt composition (as in $Li_2OHCl$). In the positive mode m/z spectrum (FIG. 2E) the intensity of $^7Li^+$ ions is three orders of magnitude higher than other positive species, indicating that there is no detectable contamination by other metals.

Figure 3A:
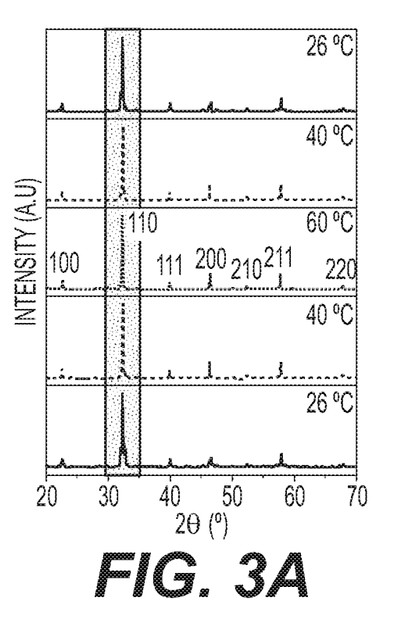
FIG. 3A illustrates X-ray diffraction (XRD) patterns of $Li_2OHCl$ collected at 26, 40, and 60° C. (heating), and 40 and 26° C. (cooling) in the angular 2θ range of 20–70°, where the major diffraction peaks of the cubic structure (Pm-3m) are indexed with Miller indices.
Figure 3B:
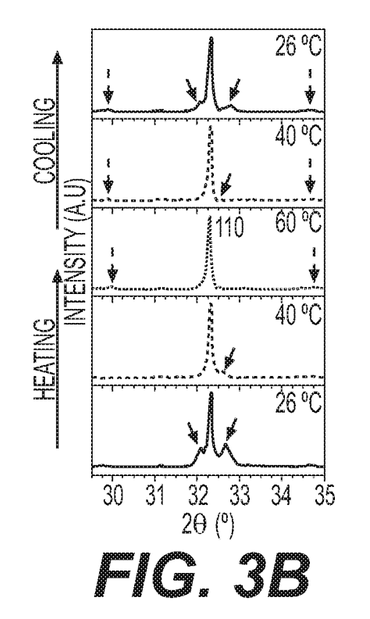
FIG. 3B illustrates a higher resolution XRD pattern of $Li_2OHCl$ in a more narrow diffraction region, where solid arrows indicate the side peaks of the dominant (110) plane in the orthorhombic and tetragonal phases, the dotted arrows indicate (111) and (200) peaks of LiCl, which appear upon heating of $Li_2OHCl$ to 60° C., and the peaks of LiCl remain visible in the XRD pattern upon cooling to 26° C.
Figure 3C:
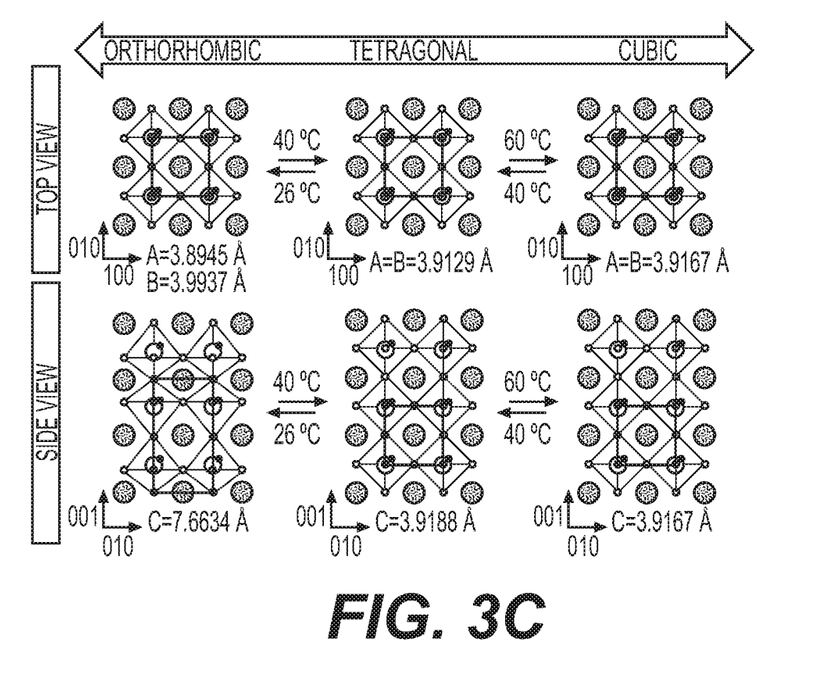
FIG. 3C represents the schematics of the phase transformation of $Li_2OHCl$, which starts from orthorhombic phase at 26° C. followed by the tetragonal and cubic phases at 40 and 60° C., respectively. In the top and side view of a 2×2×3 supercell of $Li_2OHCl$, nine blue, red, yellow, white, and black spheres are $Cl^-$, $O^{2-}$, $Li^+$, Vacancy, and $H^+$, respectively.

FIGS. 3A-3C illustrate example in-situ structural characterizations of $Li_2OHCl$. More specifically, FIG. 3A illustrates X-ray diffraction (XRD) patterns of $Li_2OHCl$ collected at 26, 40, and 60° C. (heating), and 40 and 26° C. (cooling) in the angular 2θ range of 20-70°, where the major diffraction peaks of the cubic structure (Pm-3m) are indexed with Miller indices; FIG. 3B illustrates a higher resolution XRD pattern of $Li_2OHCl$ in a more narrow diffraction region, where solid arrows indicate the side peaks of the dominant (110) plane in the orthorhombic and tetragonal phases, the red arrows indicate (111) and (200) peaks of LiCl, which appear upon heating of $Li_2OHCl$ to 60° C., and the peaks of LiCl remain visible in the XRD pattern upon cooling to 26° C.; FIG. 3C represents the schematics of the phase transformation of $Li_2OHCl$, which starts from orthorhombic phase at 26° C. followed by the tetragonal and cubic phases at 40 and 60° C., respectively. In the top and side view of a 2×2×3 supercell of $Li_2OHCl$, nine blue, red, yellow, white, and black spheres are $Cl^-$, $O^{2-}$, $Li^+$, Vacancy, and $H^+$, respectively.

Referring to FIGS. 3A-3B, structural changes in the SSEs were analyzed by means of high temperature in-situ XRD. In particular, FIGS. 3A-3B show selected results for $Li_2OHCl$ samples. At room temperature (RT), $Li_2OHCl$ exists in an orthorhombic phase, as was evidenced by the crystal lattice parameters obtained after Pawley refinement. Heating from RT to 40° C. leads to noticeable changes in the crystal lattice (FIG. 3C). The volume of the unit cell drops from 119.2 to 59 Å³ (although the overall material expands by less than approximately 1 vol. %) due to the lattice distortions and changes in the c plane from 7.66 to 3.92 Å (FIG. 3C). Contrary to previous treatment by others as orthorhombic to cubic transition, the inventors have shown that at 40° C. contaminant-free $Li_2OHCl$ exists in tetragonal phase with lattice parameters a=3.91 Å, b=3.91 Å, c=3.92 Å (FIG. 3C). The diffracted pattern of tetragonal phase differs from the cubic phase only by one small intensity peak at 32.64° 2θ peak (solid arrows, FIG. 3B). The transition from tetragonal to cubic phase completes at 60° C. Heating beyond 60° C. leads to further increase in the unit cell volume, as might be expected for thermal expansion. The process of orthorhombic-tetragonal-cubic phase transition was found to be reversible, as multiple heating-cooling steps from 26° C. to 200° C. and back to 26° C. always lead to an orthorhombic phase of $Li_2OHCl$.

To reveal the influence of H on the conductivities of Li-antiperovskite SSEs measured under identical (and tightly controlled) conditions, the inventors synthesized samples with lower hydrogen content (with the intent of producing $Li_{2.5}OH_{0.5}Cl$ and $Li_3OCl$ samples, respectively). In this particular exemplary experiment, the inventors used n-BuLi to deprotonate the hydroxyl group of $Li_2OHCl$. In certain applications, the use of n-BuLi over other bases may be advantageous because the side product of the deprotonation reaction is n-butane gas, which safely escapes the reaction mixture (Equations 2-3 below). Therefore, the n-BuLi deprotonation of $Li_2OHCl$ is a contaminant-free technique to substitute protons by lithium. In addition to n-BuLi, other bases may also be used for the deprotonation. Examples may include tert-BuLi, lithium diisopropyl amide (LDA), lithium hexamethyldisilazane (LiHMDS), among others.

$$Li_2OHCl+0.5\ eq.\ n\text{-Bu-Li} \rightarrow Li_{2.5}OH_{0.5}Cl+0.5\ eq.\ n\text{-Bu-H}\uparrow \qquad (Eq.\ 2)$$

$$Li_2OHCl+1\ eq.\ n\text{-Bu-Li} \rightarrow Li_3OCl+n\text{-Bu-H}\uparrow \qquad (Eq.\ 3)$$

Deprotonated/lithiated SSE compositions were synthesized overnight at room temperature (FIG. 3A). The content of H was determined by $^1$H NMR technique. While slightly modified compositions were achieved, the experiments allowed the Li:H ratio in the SSE samples to be systematically varied. The XRD data showed a similar pattern to that of $Li_2OHCl$, as was expected (FIGS. 3B-3C). No possible decomposition products were detected, suggesting success of the deprotonation procedures. Due to the use of mild reaction conditions, the inventors were able to overcome the highly undesired decomposition of $Li_3OCl$ in this particular experiment, which is conventionally observed when using alternative high-temperature synthesis methods.

Figure 4A:
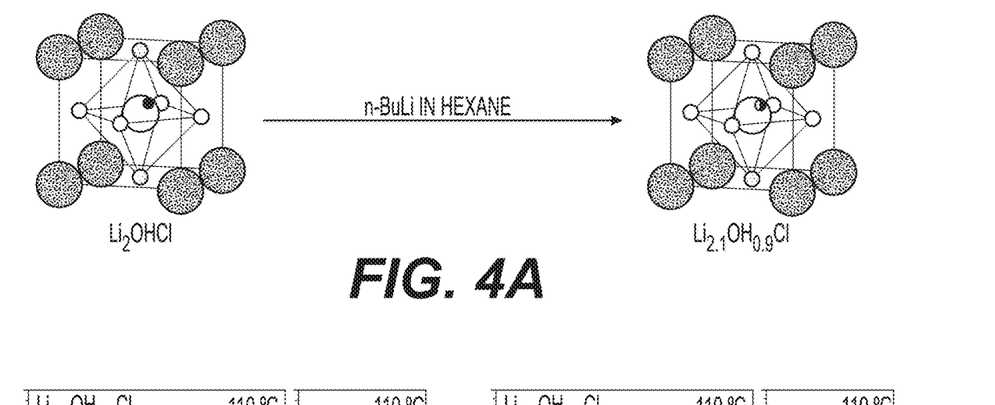
FIG. 4A illustrates schematics of $Li_2OHCl$ deprotonation with the formation of $Li_{2.1}OH_{0.9}Cl$, where the large shaded outer spheres are $Cl^-$, the large unshaded central sphere is $O^{2-}$, the small unshaded spheres are $Li^+$, and small shaded spheres are vacancies, and the small solid or partially solid sphere is $H^+a$.
Figure 4B:
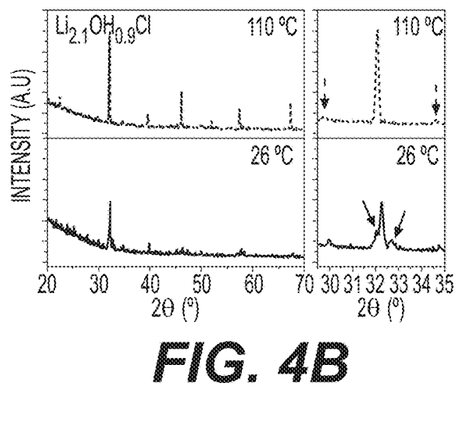
FIG. 4B illustrates XRD patterns of $Li_{2.1}OH_{0.9}Cl$ where solid arrows indicate the side peaks of the dominant (110) plane in the orthorhombic phase, and dotted arrows indicate (111) and (200) peaks of LiCl, which appear upon heating of $Li_{2.1}OH_{0.9}Cl$ beyond 60° C.
Figure 4C:
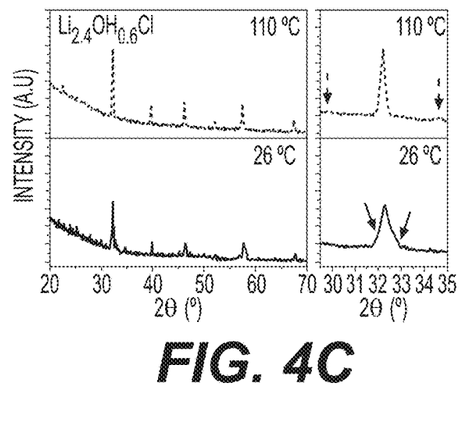
Figure 4D:
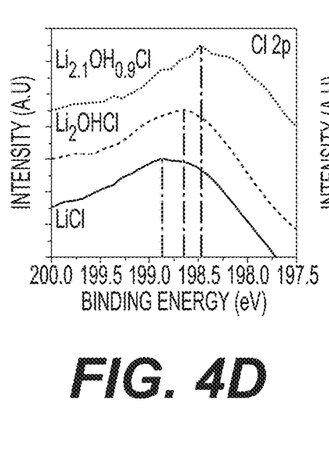
FIGS. 4D-4F illustrate X-Ray photoelectron spectroscopy (XPS) analysis of Cl 2p spectrum (FIG. 4D), O 1s spectrum (FIG. 4E), and Li 1s spectrum (FIG. 4F).
Figure 4E:
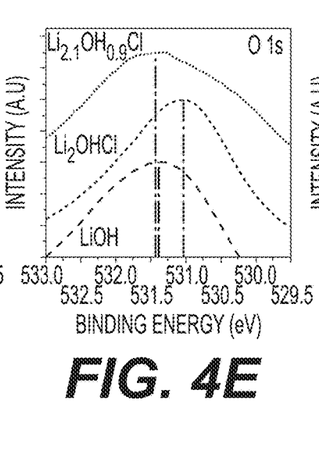
Figure 4F:
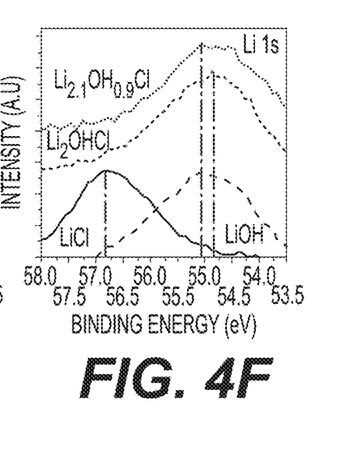

FIGS. 4A-4F illustrate example characterizations of H content in the deprotonated $Li_{2+x}OH_{1-x}Cl$. More specifically, FIG. 4A illustrates schematics of $Li_2OHCl$ deprotonation with the formation of $Li_{2.1}OH_{0.9}Cl$, where the large shaded outer spheres are $Cl^-$, the large unshaded central sphere is $O^{2-}$, the small unshaded spheres are $Li^+$, and small shaded spheres are vacancies, and the small solid or partially solid sphere is $H^+a$; FIG. 4B illustrates XRD patterns of $Li_{2.1}OH_{0.9}Cl$ where solid arrows indicate the side peaks of the dominant (110) plane in the orthorhombic phase, and dotted arrows indicate (111) and (200) peaks of LiCl, which appear upon heating of $Li_{2.1}OH_{0.9}Cl$ beyond 60° C.; FIG. 4C illustrates XRD of $Li_{2.4}OH_{0.6}Cl$; XPS analysis allowed for detecting the impact of deprotonation on Cl, O and Li bonding. FIGS. 3D-3F show results obtained on Li-hydroxyl-halide compounds ($Li_2OHX$) with different degree of deprotonation in comparison with that of the starting materials (LiCl and LiOH). The detailed scans for Cl, O, and Li were analyzed to understand the changes in binding energy (BE). FIGS. 4D-4F illustrate X-Ray photoelectron spectroscopy (XPS) analysis of Cl 2p spectrum (FIG. 4D), O 1 s spectrum (FIG. 4E), and Li 1 s spectrum (FIG. 4F).

Figure 5:
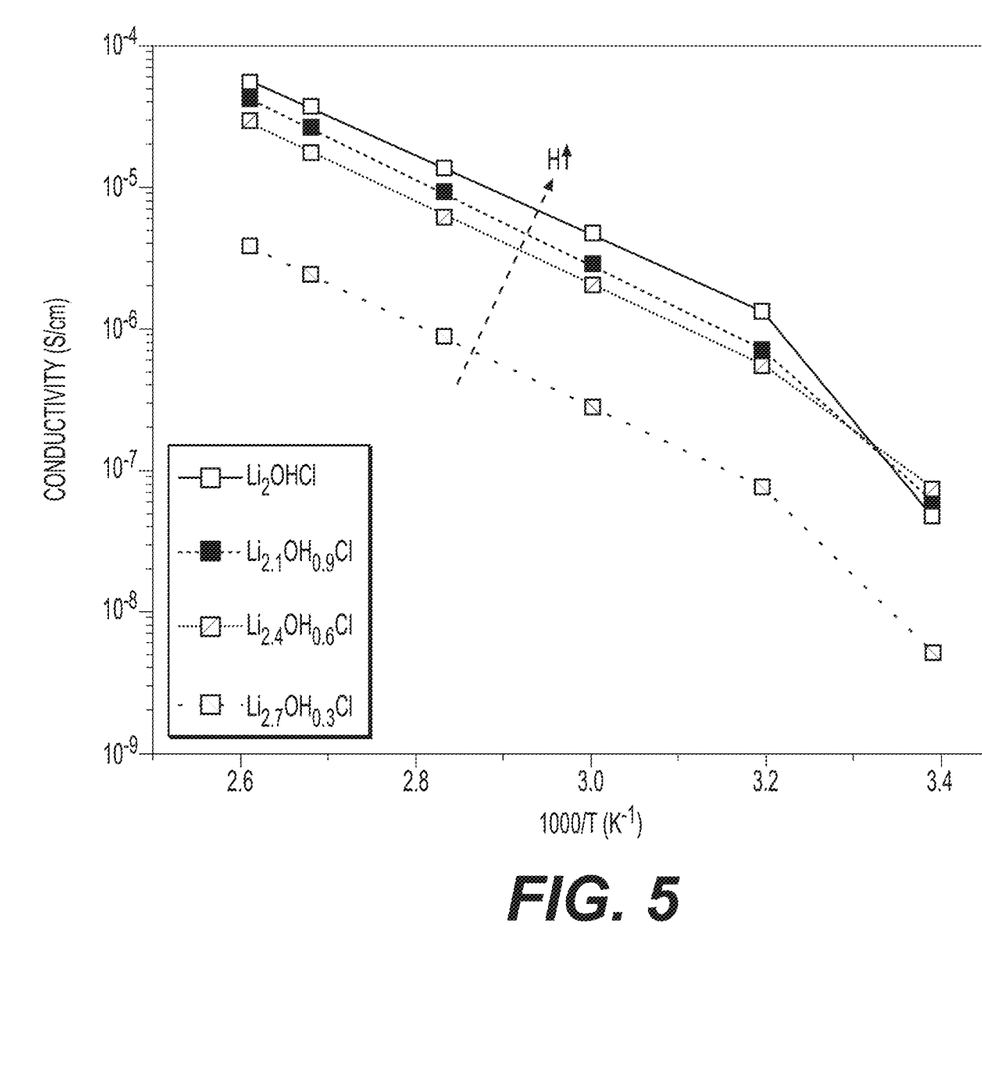
FIG. 5 illustrates an example of temperature dependence of Li-ion conductivity of solid state electrolytes (SSEs) and the impact of hydrogen.

FIG. 5 shows ionic conductivity of an example SSE measured in the temperature range from 26 to 110° C. Apart from the RT data in the case of the SSEs, the dependences are Arrhenius. The initial significant increase in conductivity of the Cl-based SSEs upon heating from RT correlates with orthorhombic-to-tetragonal/cubic phase transformations. Significantly higher conductivity in SSEs with higher proton concentration is clearly observed.

In order to understand the mechanism of Li diffusion in the discussed SSE families and gain better fundamental understanding of the of origin of enhanced conductivity with the presence of protons, Born-Oppenheimer molecular dynamics (BOMD) simulations were conducted.

Modeling studies of superionic lithium-rich antiperovskites SSE structures have reported a variety of charge transport mechanisms ranging from the low-barrier three-atom hop mechanism involving vacancies, Li hops to the nearest neighbor, Li interstitial dumbbells, and diffusion of the $Li^+$ interstitials in LiCl-deficient $Li_3OCl$ that outnumber vacancies by 2-3 orders of magnitude as predicted by the shell model. DFT calculations have also been successful in predicting the Cl-rich channel with Br-rich end points configuration leading to low vacancy migration barriers in $Li_3OX$ (X=Cl, Br) conductors. Moreover, DFT calculations uncovered entropic stabilization of $Li_3OCl$ at high temperature, high band gaps of 6.39 and 5.84 eV for $Li_3OCl$ and $Li_3OBr$ that are required for high voltage window and electrochemical stability.

The inventors used further modeling efforts to understand the mechanisms of lithium transport and the influence of H concentration in antiperovskites that have not been examined in the previous modeling studies of H-free antiperovskites. Specifically, Born-Oppenheimer molecular dynamics (BOMD) simulations of $Li_{2+x}OH_{1-x}Cl$ ($0 \leq x \leq 1$) solid electrolytes were performed in order to gain insights into the mechanism of lithium transport and the influence of H concentration. Unlike force field-based methods, ab initio BOMD simulations do not heavily rely on the fitting of force field parameters and, thus, offer more reliable prediction of energetic and transport properties, albeit at significantly higher computational cost.

BOMD simulations were performed on lithium-rich antiperovskites conductors with the following compositions: $Li_2OHCl$, $Li_{2.5}OH_{0.5}Cl$, $Li_{2.92}OH_{0.08}Cl$ and $Li_3OCl$. The simulation cell was comprised of 320 atoms, which are larger than the previous simulations cells used in ab initio simulations of the H-free lithium-rich antiperovskites conductors. Much larger simulation cells were chosen to minimize the artifacts due to defect—defect interactions through periodic boundary conditions that were present in the previous simulations. Density Functional Theory (DFT) calculations were performed with the QUICKSTEP module of the CP2K code, which implements the dual Gaussian and Plane Waves (GPW) method. The gamma point supercell approach was used in combination with 3-dimensional Periodic Boundary Conditions (PBC). Calculations were performed using the spin-polarized Perdew-Burke-Ernzerhof (PBE) exchange correlation functional with Grimme's D3 dispersion correction.

Figure 6:
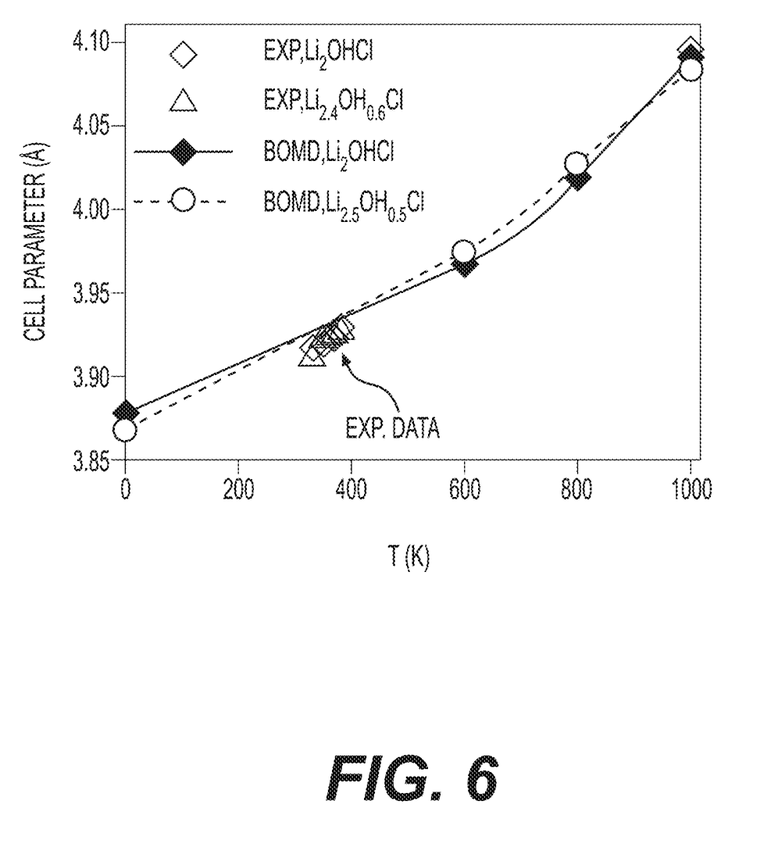
FIG. 6 illustrates example cell parameters from Born-Oppenheimer Molecular Dynamics (BOMD) simulations and experiments.

The starting point for generating the $Li_3OCl$ bulk structure model was the published crystal structure of the calcium titanate ($CaTiO_3$) perovskite. Since both $CaTiO_3$ and $Li_3OCl$ belong to the same Pm3m space group, the $Li_3OCl$ antiperovskite bulk structure was obtained by the proper inversion of Wyckoff atomic sites in the $CaTiO_3$ bulk crystal structure. Protonated $Li_3OCl$ systems with stoichiometry $Li_{2.5}OH_{0.5}Cl$ and $Li_2OHCl$ were generated following a well-known unit cell structure diagram. The $H^+$ atoms in the initial configurations were positioned on the axis of an O—Cl bond in conjunction with an ordered arrangement of Li vacancies. Cell relaxation calculations were performed for the initial configurations of the $Li_3OCl$, $Li_{2.5}OH_{0.5}Cl$, and $Li_2OHCl$ systems. The optimized structures were then submitted for a short 1-ps temperature ramping molecular dynamics (MD) run to three different target temperatures of 800 K, 1000 K, and 1200 K. The gradual temperature ramping MD runs were followed by a 4-ps equilibration (velocity rescaling) MD simulation. The initial NPT simulations were performed for 7-25 ps to obtain cell parameters at 1 atm pressure that are shown in FIG. 6. Cell parameters from BOMD simulations were found to be in excellent agreement with the extrapolated experimental values. Note that BOMD simulations and experiments predict similar cell parameters for $Li_{2.5}OH_{0.5}Cl$, and $Li_2OHCl$ materials indicating that cell parameters could not be used to reliably probe the H-content of these SSE. Cell parameters of $Li_3OCl$ are, however, noticeably smaller than cell parameters for $Li_{2.5}OH_{0.5}Cl$, indicating a possibility to use cell parameters to potentially confirm that SSE is H-free.

The BOMD production runs performed for 10-30 ps in NVT ensemble and are used to improve accuracy of predictions. The SSE long range ordering was preserved for all samples at 1000 K and below. The long-range order for $Li_3OCl$ and $Li_{2.92}OH_{0.08}Cl$ was also preserved at 1200 K on the simulation timescale. No H, O or Cl diffusion was observed on the simulation timescale. This confirms that the contribution of $Li^+$ to the total ionic conductivity is nearly 100%.

Figure 7A:
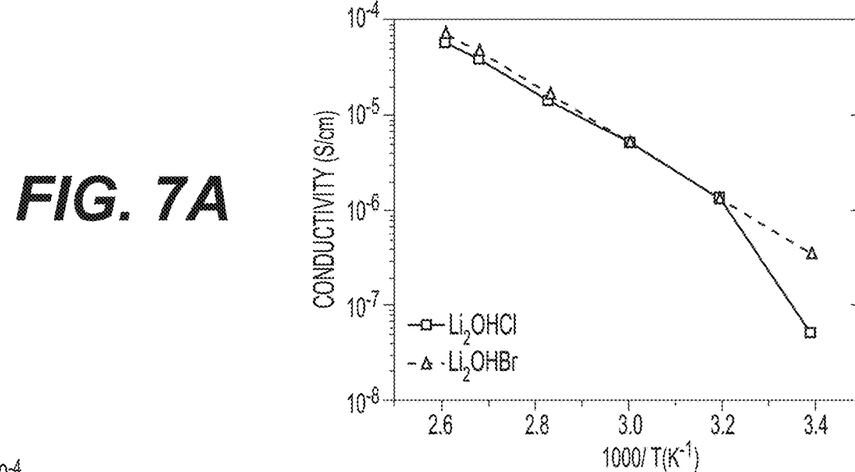
FIGS. 7A-7C illustrate example conductivities of lithium-rich antiperovskites conductors from BOMD simulations compared to extrapolated experimental values as a function of temperature.
Figure 7B:
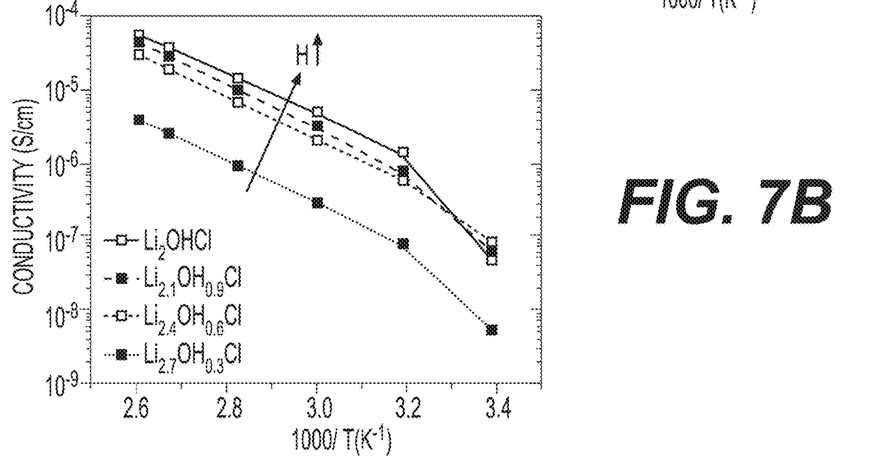
Figure 7C:
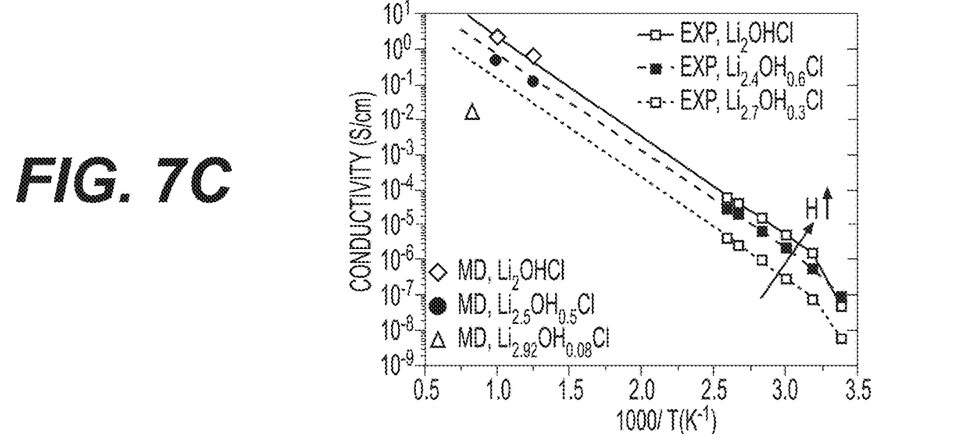

FIGS. 7A-7C show conductivities for the overheated SSEs as a function of temperature. BOMD simulations predict conductivities of $Li_2OHCl$ and $Li_{2.5}OH_{0.5}Cl$ in excellent agreement with the extrapolated experimental data (even when structural defects and vacancies are not considered in BOMD). The activation energies (slopes of the dependencies) for all the SSEs are similar and Li diffusion are significantly higher for the samples with higher H-concentrations.

Figure 8A:
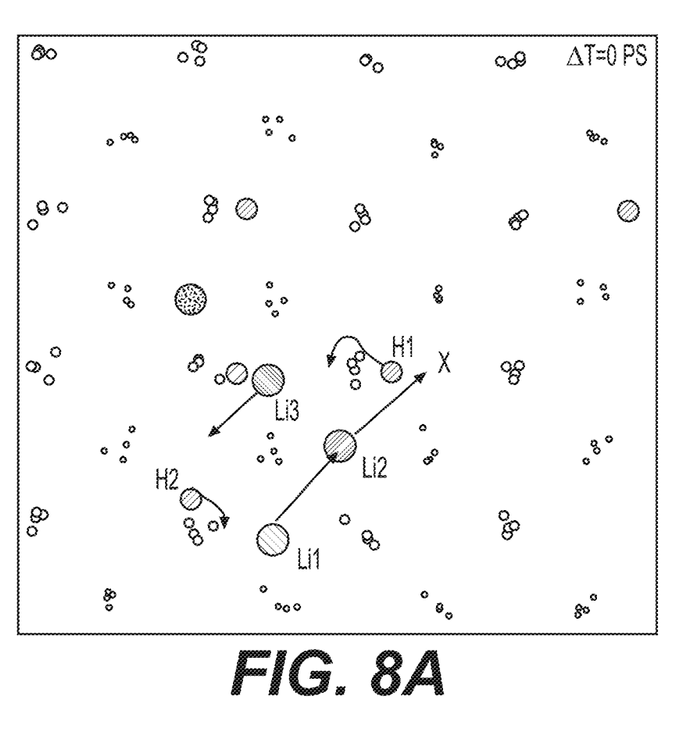
FIGS. 8A-8B are snapshots that are 9 ps apart from BOMD simulations of $Li_{2.92}OH_{0.08}Cl$ SSE before the $Li^+$ (denoted as Li1, Li2, Li3) concerted motion (FIG. 8A) and after the $Li^+$ jumps occurred (FIG. 8B). The accompanied motion of H1 and H2 is also shown. Oxygen (the larger unshaded circles), hydrogen (the line-pattern filled circles marked as H1-H2 and other circles filled with similar line-patterns) and chlorine (the smaller unshaded circles) atoms are also shown.
Figure 8B:
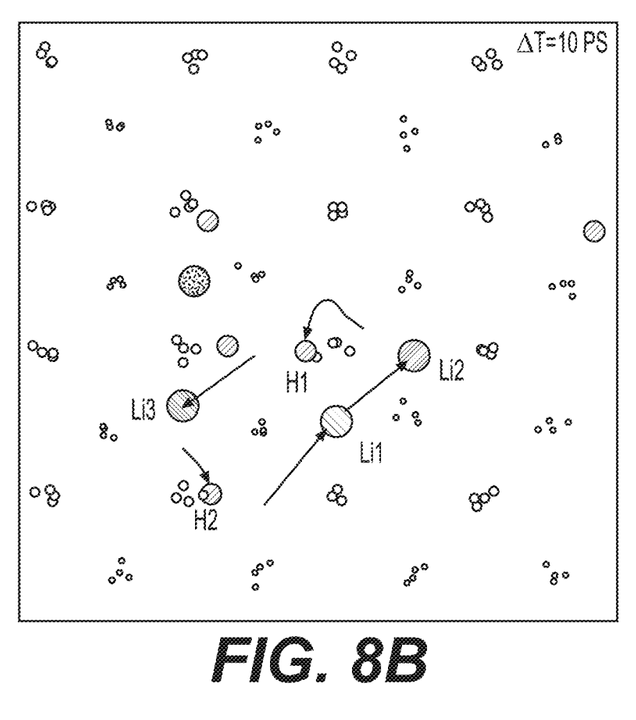

A detailed investigation of the Li transport mechanism unveiled OH rearrangement (e.g., rotation) and a correlated motion of $Li^+$ accompanied such a rearrangement movement. FIGS. 8A-8B are snapshots that are 9 ps apart from BOMD simulations of $Li_{2.92}OH_{0.08}Cl$ SSE before the $Li^+$ (denoted as Li1, Li2, Li3) concerted motion (FIG. 8A) and after the $Li^+$ jumps occurred (FIG. 8B). The accompanied motion of H1 and H2 is also shown. Oxygen (the larger unshaded circles), hydrogen (the line-pattern filled circles marked as H1-H2 and other circles filled with similar line-patterns) and chlorine (the smaller unshaded circles) atoms are also shown.

Tracing motion of Li and H positions during simulations clearly shows that the rearrangement (e.g., rotation) of the OH group containing H1 atom creates a vacancy denoted as "X" in FIG. 8A. The Li2 fills that vacancy (see arrow from Li2 to X in FIG. 8A). Because the H1 and Li2 motion is correlated, this mechanism may be classified as the rearrangement (e.g., rotation) of H1, which allows for the Li interstitial formation due to the reduced strain energy at the previously occupied position ("X").

Alternatively, it may be interpreted that a formed Li interstitial pushes OH group to rotate away from it and this rotational ability of OH allows for the otherwise unfavorable Frenkel defect formation. In this case, as soon as Li2 is moved, Li1 jumps to the position previously occupied by Li2 creating a vacancy, that was followed by rotation of the OH group with H2. Rotation of H1, in its turn, creates a high-energy state for the Li3 lithium that pushes to jump to the nearest site (e.g., this configuration become energetically favorable due to rotation of H2).

It is hypothesized that OH-rearrangement (e.g., rotation) requires less than 0.4 eV to create a defect. This is significantly lower in energy than defect creation energy in the H-free analogs SSE. By deviating from $Li_{2+x}OH_{1-x}Cl$ (where x is between 0 and 1) to $Li_{2+x}O_yH_{1-x}Cl_z$ (where z is between 0.8 or 3, 2y+z=3 or more, x is between 0 and 1) stoichiometry and further to other stoichiometries (e.g., by using mixed halogens (e.g., Cl, B, I and F), by replacing some of the Li atoms with other atoms of other metals or semimetals such as Be, Mg, Ca, Sr, Ba, Cs, K, Na, Y, La and other lanthanides, Mo, B, Si, Ge, Sb, Bi, Sn, P or their mixtures, by reducing the oxygen content relative to the content halogens, by replacing some of the O atoms with sulfur (S) or nitrogen (N) and by other means), it may be possible to further reduce energy for the formation of such (and other beneficial for Li ion motion) defects or otherwise reduce energy barrier for Li ion motion in such electrolytes or otherwise enhance Li ion conductivity in such electrolytes. As such, these deviations to stoichiometry may be advantageous for use in solid electrolytes and batteries comprising such electrolytes.

The extensive material characterization techniques provided herein, such as NMR, EDS, TOF-SIMS, XPS and XRD, allowed careful identification of the composition of synthesized $Li_{2+x}OH_{1-x}Cl$ (0≤x<1) SSEs and the phases formed at different temperatures. These studies suggest that most of the previously produced and previously reported SSE materials were not the anticipated $Li_3OCl$, but rather $Li_2OHCl$. By using leak-free electrochemical cells, carefully selecting an equivalent circuit model and precisely measuring the fraction of H in such SSEs, the inventors unambiguously identified that the presence of H enhances $Li^+$ conductivity of $Li_{2+x}OH_{1-x}Cl$ significantly. In contrast to a previous erroneous belief that the formation of Frenkel defects may be highly unfavorable in antiperovskites, the inventors found that the presence of H changes the defect energetics substantially. More specifically, the BOMD simulations revealed an unexpected mechanism of the $Li^+$ transport that involves the $OH^-$ group rearrangement or rotation, creating a Frenkel defect near the $OH^-$ group that is filled with the nearby $Li^+$. A short (compared to much longer O—Li distance) and rearrangeable or rotatable O—H bond provides an extra space for the more facile (compared to the H-free SSE) Frenkel defect formations. In certain applications, such defects contribute to achieving fast, highly-correlated $Li^+$ transport that is coupled with the OH rearrangement or rotation in H-containing antiperovskite SSEs. Rotating doors in buildings may serve as simple mechanical analogies for $Li^+$ motion. Inducing controlled amounts of other types of point defects by doping and other mechanisms may be used to further enhance $Li^+$ transport. So, referring to FIGS. 8A-8B, as new vacancies X are introduced, the rearrangeable OH group (or chalcogen-metal-hydrogen group) may transition in accordance with a successive rotational sequence of arrangements of H1, H2, Li1, Li2 and Li3.

It will be appreciated that both the composition and the crystal structure of the solid state electrolytes with rotatable or rearrangeable bonds as described herein and found by the inventors to enhance the ion transport may differ and not necessarily comprise $O^{2-}$ or $Cl^-$ or only these two anions and only $H^+$ or $Li^+$ or only these two cations. In one aspect of the present disclosure, the use of a "rotatable or rearrangeable oxygen-metal (e.g., oxygen-hydrogen) group" or, more generally, the use of "rotatable or rearrangeable chalcogen-metal (e.g., sulfur-metal or sulfur-hydrogen) group" in solid electrolytes may be advantageous to enhance transport of conducting metal ions (e.g., $Li^+$, $Na^+$, $K^+$, $Ca^+$, $Mg^{2+}$, etc., of the corresponding solid electrolytes) by using solid electrolyte compositions with a relatively short chalcogen1-metal bond (compared to the chalcogen2-$Li^+$ or chalcogen2-$Na^+$ or chalcogen2-$K^+$ or chalcogen2-$Ca^+$ or chalcogen2-$Mg^{2+}$ metal bonds, etc.) (e.g., at least 2% shorter, preferably 4-80% shorter). It will be appreciated that chalcogen1 and chalcogen2 atoms may exhibit different compositions (e.g., one may be O and another one may be S) in some configurations. Chalcogen 1 and 2 may also be randomly mixed chalcogens.

In another aspect of the present disclosure, the crystal structure of the solid electrolyte may be amorphous (glassy), perovskite, antiperovskite, layered, cubic, or mixed (e.g., glassy-nanocrystalline with cubic or perovskite or antiperovskite structured nanocrystals, etc.), among others. In one aspect of the present disclosure the average grain size of the nanocrystals (e.g., in suitable glassy-nanocrystalline electrolytes) may range from about 1 nm to about 500 nm.

In another aspect of the present disclosure, a small amount of solvents or ionic liquids (e.g., as 1-50 vol. % of the total electrolyte composition) may be added to milled solid electrolyte composition (e.g., with the average grain or particle size in the range from about 2 nm to about 500 nm in size) so that the overall electrolyte composition comprises a mixture of solid and liquid phases.

In another aspect of the present disclosure, instead of a single phase (e.g. a solid solution) electrolyte composition, it may be advantageous for the electrolyte composition to comprise two or three or even four distinct phases. In an example, each phase may exhibit different a melting point and ionic conductivity.

In one aspect of the present disclosure, the described electrolyte compositions may be a part of the "mixed" final electrolyte (e.g., which may additionally comprise other ceramic or liquid or polymer phases, including other ceramic, liquid or polymer electrolytes).

In one aspect of the present disclosure, it may be advantageous to select electrolyte compositions with a melting point (of at least one component in case of the "mixed" electrolyte composition of the solid electrolyte) below 500° C. It may be even more advantageous for the electrolyte composition (e.g., of at least one component in case of the "mixed" electrolyte composition of the solid electrolyte) to exhibit a melting point below about 350° C. (e.g., and in some cases—below 250-300° C.).

In one aspect of the present disclosure, it may be advantageous to introduce electrolyte into at least one of the electrodes (or pre-assembled {anode/separator/cathode} stack(s)) by using melt-infiltration (melt-impregnation) technology, where electrolyte and an electrode (or stack) is first heated to above the melting point of the electrolyte and then molten electrolyte is infiltrated into it. In some designs, it may be advantageous to conduct this procedure under reduced pressure (in vacuum) to ensure complete or nearly complete electrode pore filling. In the case of melt infiltration, in an example, the issues of moisture or $CO_2$ or air sensitivity of the electrolytes may be overcome because it is easier and less expensive to conduct electrolyte filling in a controlled environment than to use controlled environment during electrode assembling and stacking. In one aspect of the present disclosure, it may be advantageous to deposit a surface layer on the electrode or active material particles (e.g., by solution infiltration, by chemical vapor deposition, by atomic layer deposition or other techniques) prior to melt-infiltration to enhance wetting or reduce contact resistance. In some designs, it may be advantageous to conduct melt-infiltration on pressurized or packed electrodes or stacks (e.g., pre-assembled in an open cell) so that the undesirable expansion of the electrodes or the stacks could be minimized or avoided. This may maximize the volumetric energy of the cells.

In another aspect of the present disclosure, the strength of the rearrangeable chalcogen-metal bond may be higher than that of the longer chalcogen-$Li^+$ bond (or chalcogen2-$Na^+$ or chalcogen2-$K^+$ or chalcogen2-$Ca^+$ or chalcogen2-$Mg^{2+}$ metal bond, etc., depending on whether the metal ion conduction of the solid electrolyte proceeds via the movement of Li ions or Na ions or K ions or Ca ions or Mg ions, etc.)

It should be appreciated that bond rotation or re-arrangement may co-exist with other mechanisms of Li transport in the described electrolyte compositions and, in some cases, may not even be a dominant one.

As briefly discussed above, the composition of the suitable disclosed solid electrolyte may vary, while still providing a useful rotatable or rearrangeable group or other structural or chemical features that facilitates the ion transport and solid electrolyte performance in cells. In one illustrative example, the Cl may be substituted with a mixture of halides (e.g., a mixture of F—, Br— and I— with Cl— or a mixture of F— with Cl—), which may be advantageous in some designs. In other illustrative examples, O may be replaced with a mixture of different chalcogens (e.g., S and O) or a mixture of group 5 element(s) (e.g., N or P or As, etc.) with a chalcogen or a mixture of chalcogens (e.g., a mixture of N with O and S or a mixture of N with O). In other illustrative examples, Li may be partially replaced with a mixture of group 2 or group 3 elements (e.g., Mg or Ca or Sr or B or Al or Ga, etc.) with a chalcogen or a mixture of chalcogens (e.g., a mixture of B with O or a mixture of Al with O and S) or a combination of the mixtures described above. In other illustrative examples, the LiOH portion of the solid electrolyte composition may be replaced with mixtures of LiSH, LiNH, $Bi(OH)_3$, other hydroxides, etc., with LiOH. The $Li^+$ ion composition (or, more generally, conducting/moving ion composition in the solid electrolytes) may be replaced with a mixture of $Li^+$ (or other conducting/moving ions) with the mixture of other ions (e.g., $Ba^{2+}$, etc.) with $Li^+$ (or other conducting/moving ions). Similarly, $Li^+$ (or other conducting/moving ions of the corresponding solid electrolyte) may be replaced with the mixture of $Li^+$ (or other conducting ions) with a suitable transition metal or their mixtures (e.g., with $Al^{3+}$, $Ta^{3+}$, $Zr^{4+}$, $Hf^{4+}$, etc., where their different valence may introduce favorable defects that may also enhance ion conductivity or stability of the solid electrolyte). Similarly, $Li^+$ (or other conducting/moving ions of the corresponding solid electrolyte) may be replaced with the mixture of $Li^+$ (or other conducting ions) with a suitable rare-earth metal(s) (e.g., $La^{3+}$ or others) or their mixtures. Similarly, $Li^+$ (or other conducting/moving ions of the corresponding solid electrolyte) may be replaced with the mixture of $Li^+$ (or other conducting ions) with ions of Mg, Ca, Sr, Ba, Cs, K, Na, Sc, Y or non-La lanthanoids or their combination(s). The above-discussed substitutions and their mixtures could be advantageously used in combination(s) as an electrolyte composition or a part of the electrolyte compositions.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A solid electrolyte for a metal or metal-ion battery cell, comprising:
   a material having one or more rearrangeable chalcogen-metal-hydrogen groups that are configured to transport at least one metal-ion or metal-ion mixture through the solid electrolyte,
   wherein the solid electrolyte exhibits a melting point below about 350° C.

2. The solid electrolyte of claim 1, wherein the one or more rearrangeable chalcogen-metal-hydrogen groups are configured to be rearranged relative to one or more previous arrangements of the at least one metal-ion or metal ion mixture and at least one hydrogen of the respective one or more rearranged chalcogen-metal-hydrogen groups of the material to facilitate the transport of the at least one metal-ion or metal-ion mixture through the solid electrolyte.

3. The solid electrolyte of claim 2, wherein the one or more rearrangeable chalcogen-metal-hydrogen groups are configured to be rearranged in accordance with a successive rotational sequence of arrangements of the at least one metal-ion or metal ion mixture, and the at least one hydrogen to facilitate the transport of the at least one metal-ion or metal-ion mixture through the solid electrolyte.

4. The solid electrolyte of claim 1, wherein the one or more rearrangeable chalcogen-metal-hydrogen groups comprise a chalcogen and the at least one metal-ion or metal-ion mixture.

5. The solid electrolyte of claim 4, wherein the chalcogen comprises O, S, a mixture of O and S, a mixture of N, O and S, a mixture of group 5 elements, a mixture of group 3 elements, a mixture of chalcogens, or any combination thereof.

6. The solid electrolyte of claim 4, wherein the metal-ion comprises Li, Na, K, Mg or Ca.

7. The solid electrolyte of claim 4, wherein the metal-ion mixture comprises a mixture of the metal ion with one or more other ions.

8. The solid electrolyte of claim 7, wherein the one or more other ions include $Ba^{2+}$.

9. The solid electrolyte of claim 4, wherein the metal-ion mixture comprises a mixture of the metal ion with a transition metal or transition metal mixture.

10. The solid electrolyte of claim 9, wherein the transition metal or transition metal mixture comprises $Al^{3+}$, $Ta^{3+}$, $Zr^{4+}$, $Hf^{4+}$, or a combination thereof.

11. The solid electrolyte of claim 4, wherein the metal-ion mixture comprises a mixture of the metal ion with a rare-earth or rare-earth-like metal or their mixtures.

12. The solid electrolyte of claim 11, wherein the rare-earth or rare-earth-like metal is $Sc^{3+}$, $Y^{3+}$, or $La^{3+}$.

13. The solid electrolyte of claim 1, wherein the solid electrolyte is configured to be introduced into the metal or metal-ion battery cell by melt-infiltration.

14. A method of synthesizing a solid electrolyte, comprising:
providing a first dry metal-ion composition comprising a chalcogen, a metal or metal mixture, and hydrogen;
providing a second dry metal-ion composition comprising a metal halide or a mixture of metal halides;
mixing the first and second dry metal-ion compositions together;
arranging the mixture inside of a mold; and
heating the mixture while arranged inside of the mold at least to a melting point of the mixture so as to produce a material comprising one or more rearrangeable chalcogen-metal-hydrogen groups that are configured to transport at least one metal-ion or metal-ion mixture through the material,
wherein the mixture exhibits a melting point below about 350° C.

15. The method of claim 14, wherein the chalcogen comprises O, S, a mixture of O and S, a mixture of a given chalcogen with N, a mixture of the given chalcogen with P, or any combination thereof.

16. The method of claim 14, wherein the first dry metal-ion composition comprises LiOH, LiSH, LiNH, $Bi(OH)_3$, or a combination thereof.

17. The method of claim 14, wherein the mold comprises another material that is inert to the mixture.

18. The method of claim 14, wherein the another material comprises graphite.

19. The method of claim 14, wherein the first dry metal-ion composition and/or the second dry metal-ion composition comprise Li, Na, K, Mg, Ca, Sr, or Ba.

20. The method of claim 14, wherein the first dry metal-ion composition and/or the second dry metal-ion comprise a mixture of a respective metal ion with one or more other ions.

21. The method of claim 14, wherein the mixture comprises a metal ion mixed with a transition metal or transition metal mixture.

22. The method of claim 14, wherein the transition metal or transition metal mixture comprises $Al^{3+}$, $Ta^{3+}$, $Zr^{4+}$, $Hf^{4+}$, or a combination thereof.

23. The method of claim 14, wherein the mixture comprises a metal ion mixed with a rare-earth metal.

24. The method of claim 14, wherein the rare-earth metal is Sc, Y or La.

25. The method of claim 14, wherein the metal halide or mixture of metal halides comprises Cl, F, Br, I or a mixture thereof.

26. The method of claim 14, wherein the heating heats the mixture to at least about 350° C.

* * * * *